Jan. 9, 1934. M. M. CLAYTON 1,943,001
ELECTRICAL OUTLET
Filed Oct. 9, 1930
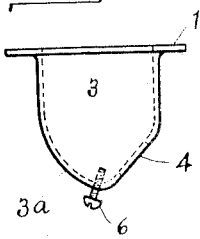
Fig. I
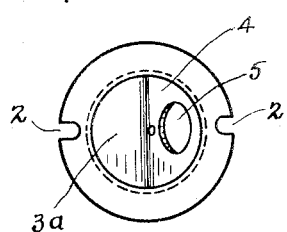
Fig. II
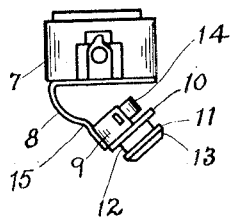
Fig. III
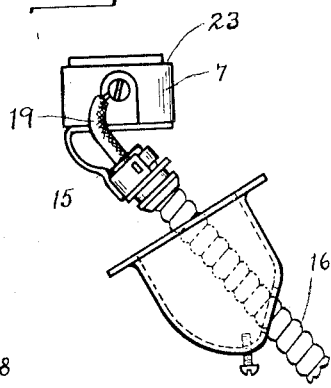
Fig. IV
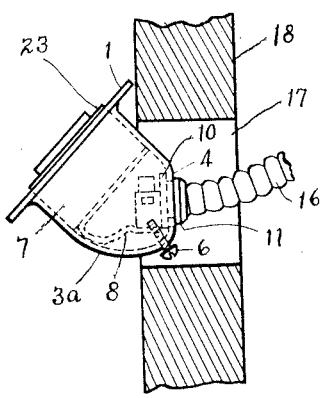
Fig. V
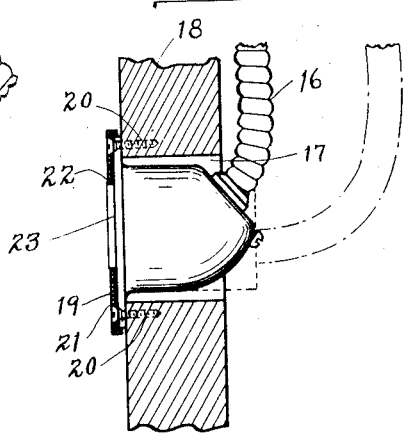
Fig. VI
INVENTOR
Martin M. Clayton
by Christy Christy and Wharton
attorneys Patented Jan. 9, 1934

1,943,001

UNITED STATES PATENT OFFICE 1,943,001

ELECTRICAL OUTLET

Martin M. Clayton, Baden, Pa., assignor to National Electric Products Corporation, a corporation of Delaware Application October 9, 1930. Serial No. 487,527

3 Claims. (Cl. 247—15)

This invention relates to an electrical outlet.

The outlet considered as a whole comprises assembled units for electrical connection and is more specifically an outlet for use in base-boards, in walls, and in floors comprising a receptacle for the reception of pronged plugs.

One common practice in wiring such outlets has been to put an outlet box in position, and then connect cables to the box by means of clamps within the box, or by means of a separate connector. A receptacle is then connected to the wires of the cable and secured to the box, after which the finished cover is put in place. This requires the purchase and handling of many separate items.

Assembled units as previously made up to include outlet box, connector, receptacle, and cover have had the objectionable feature that a cable must enter from the rear of the box, so as the box is installed, the cable is at right angles to the plane of the wall or floor in which the outlet is mounted. Since with one of these assembled units the cable must be pulled out from the wall or floor for connection, the cable when re-inserted for installation of the outlet must be bent in an arc of ninety degrees. This puts an unnecessary strain on the connection in the box, and the space required for the box and the bending of the cable does not permit the installation of such an assembly in thin partitions.

One object of my invention is to provide a compact and neat outlet assembly in which the outlet box is so shaped, and the cable is introduced thereinto at such an angle, that the assembly may be readily installed in an orifice of relatively small area in the wall of a relatively thin partition.

Associated objects of my invention are to provide means for definitely positioning the cable connector in the cable receiving orifice of the outlet box of the assembly, to space the receptacle from the connector, to position the terminal end of the cable so that it is removed from the body of the receptacle and so that its position is visible during assembly, and to provide an arrangement for yieldingly locking the receptacle and connector within the outlet box of the assembly.

In the accompanying drawing, Figure 1 is a side elevation of my improved outlet box; Figure 2 is a plan view thereof; Figure 3 is a side elevation of an assembly comprising the receptacle body and cable connector therefor; Figure 4 is a side elevation showing the cable attached to the connector after being passed through the outlet box; Figure 5 is a side elevation showing the assembly of cable, plug and connector secured to the outlet box, and illustrating the insertion of the outlet box in the orifice in a wall within which it is to be positioned; and Figure 6 is a side elevation of the complete assembly, showing the complete assembly positioned in the wall orifice, and illustrating in full lines the position of the cable in the partition, and in dotted lines the position which the cable would assume in the partition if it were attached to the outlet box to extend straight rearwardly therefrom.

In the drawing, reference numeral 1 designates the outer rim or flange of the outlet box, which is provided with notches 2 for its attachment to a base-board, wall, or the like. The wall 3 of the outlet box is primarily cylindrical in form, and may be straight in longitudinal section adjacent flange 1, so that this portion of the box is truly cylindrical. Adjacent the rear of the box its wall is provided with a plane or flattened wall portion 4, which is disposed at a substantial angle to the longitudinal axis of the box. Opposite this wall portion 4 is a portion or region 3a in which the wall of the outlet box curves rearwardly in longitudinal section toward the longitudinal axis of the box. In the flattened wall portion 4 there is an orifice 5 for the reception of an electrical cable, and in the curved wall portion 3a is a set screw 6 extending inwardly of the outlet box adjacent the orifice 5.

The plug receptacle 7 has thereon a supporting strap 8 of resilient material, which supports a cable connecting element 9. It will be noted that supporting strap 8 is curved to conform generally to the curvature of wall portion 3a of the outlet box and bears against said wall portion. This curvature also imparts additional resiliency to the supporting strap. The connector is provided with a flange or shoulder 10 of greater diameter than that of the opening 5 in the outlet box, and with a flange 11 providing a groove 12 between it and the shoulder 10. The flange 11 of the connector is terminally tapered at 13 to facilitate its passage through the cable receiving orifice 5 of the outlet box. The connector is provided with a strap 14 for engaging the cable, and the supporting strap 8 is deformed at 15 to provide a stop for the cable, which lies outside the connector in visible position.

In installing the outlet box and its associated elements, the cable 16 is pulled out through orifice 17 in a partition wall or the like 18. The cable is then passed through orifice 5 in flattened portion 4 of the outlet box wall and its terminal is secured in the connector 9, being positioned by means of deformation 15 in supporting strap 8. Wires 19 extending from the cable are connected with the receptacle 7. This initial assembly of the attachment plug cable and connector is shown in Figure 4 of the drawing, with the outlet box surrounding and carried by the cable.

In Figure 5 of the drawing the assembly has been made. The flange 10 of the connector lies against the interior surface of wall portion 4, and surrounds orifice 5 therein; supporting strap 8 lies along the curved wall portion 3a of the outlet box; and the attachment plug 7 lies within the cylindrical portion of the outlet box adjacent its flange 1. The assembly is secured in position by means of the set screw 6 which bears against connector 9 behind flange 10. This engagement forces the connector over, so that a region in groove 12 contacts the edge surrounding orifice 5, and the flanges 10 and 11 embrace the edge of the orifice in the region of contact.

It will be seen from this figure of the drawing that, because of the curved face presented by wall portion 3a of the outlet box, the outlet box may be presented to the orifice 17 at a suitable angle and then rocked into place. It will be also seen that the flattened wall portion 4 is disposed at such an angle, approximately an angle of 45°, to the longitudinal axis of the outlet box, that this rocking motion while introducing the box will force the cable 16 upwardly rather than inwardly of the partition. Because of this fact, there is not an excessive strain upon the attachments between the cable and the other elements of the assembly.

When positioned in wall 18, an annular cover 19 may rest on flange 1 of the outlet box. Screws 20, passing through notches 2 in outlet box flange 1 and holes 21 in cover 19, attach the outlet box to the wall, and the cover to the outlet box. The interior opening 22 through the cover is of such diameter that the cover abuts shoulder 23 on the receptacle. In the completely installed position, the resiliency of connecting strap 8 causes shoulder 23 on the receptacle to be held firmly against cover 19.

Figure 6 of the drawing shows the outlet box in position with cable 16 extending upwardly and substantially parallel to the partition wall 18 in which the outlet box has been positioned and secured. The cable, as shown in dotted lines in this figure of the drawing, lies in the position which it would be necessary for it to assume if it were to extend straight inwardly or rearwardly from the outlet box. From this dotted line position of the cable it will be seen that when so positioned with respect to the outlet box, it would be difficult to insert the cable between the partition walls, so that it might be wholly stowed within the partition and the outlet box positioned in the wall orifice 17.

While it is not necessary that the angularity of plane surface 4 on the outlet box be that of 45° to the axis of the outlet box, as shown, it is important that this face 4 be at a substantial angle to the axis of the outlet box in order to obtain the desired position of the cable.

It should be understood that orifice 17, as shown, is of a diameter but slightly greater than that of the outlet box. This restricted diameter of orifice 17 is highly desirable, as it may be covered by a flange of moderate width, and permits the fixture as a whole to be of neat and compact appearance. It is because of the cooperation between curved face 3a, which permits rocking the box into position, and of flattened face 4, which properly positions cable 16, that the outlet box may be positioned in an orifice which is of a diameter but slightly greater than that of the box.

The various connections within the assembly also contribute to proper installation of the outlet. The cable connector is held firmly by its engagement with the outlet box at the cable receiving orifice, and the resiliency of the connector supporting arm permits a tight engagement within the box without undue strain on the connections.

I claim as my invention:

1. An electrical outlet box having a forward wall portion with a forwardly facing opening therein and a rearward wall portion framing an opening inclined to the plane of the forward opening, in combination with an electrical receptacle, a cable connector, and a supporting bar securing the receptacle and cable connector to each other, said supporting bar shaped and attached to said receptacle and said cable connector to space the receptacle and cable connector to lie at the forward and rearward outlet box openings respectively with the axes of said members inclined to each other.

2. An electrical outlet box having a forward wall portion with a forwardly facing opening therein and a rearward wall portion framing an opening inclined to the plane of the forward opening, in combination with an electrical receptacle, a cable connector, and a curved resilient supporting bar securing the receptacle and cable connector to each other, said supporting bar shaped and attached to said receptacle and said cable connector to space the receptacle and cable connector to lie at the forward and rearward outlet box openings respectively with the axes of said members inclined to each other.

3. An electrical outlet box having a forward wall portion with a forwardly facing opening therein and a rearward wall portion framing an opening inclined to the plane of the forward opening, in combination with a receptacle adapted to lie at the forward opening, a cable connector adapted to lie at the rearward opening, and mechanical engaging means securing said receptacle and said cable connector to each other to extend as a unitary structure between the forward and rearward outlet box openings with the axes of the receptacle and the cable connector inclined to each other.

MARTIN M. CLAYTON.